(12) United States Patent
Hall

(10) Patent No.: US 7,796,194 B2
(45) Date of Patent: Sep. 14, 2010

(54) AUTOMATIC VIDEO FORMAT IDENTIFICATION SYSTEM

(75) Inventor: Raymond William Hall, Riverside, CA (US)

(73) Assignee: RGB Systems, Inc., Anaheim, CA (US)

( * ) Notice: Subject to any disclaimer, the term of this patent is extended or adjusted under 35 U.S.C. 154(b) by 234 days.

(21) Appl. No.: 11/850,671

(22) Filed: Sep. 5, 2007

(65) Prior Publication Data

US 2008/0068501 A1    Mar. 20, 2008

Related U.S. Application Data

(60) Provisional application No. 60/842,791, filed on Sep. 6, 2006.

(51) Int. Cl.
  *H04N 5/46* (2006.01)
(52) U.S. Cl. .................................. 348/558
(58) Field of Classification Search ............... 348/558, 348/554–557, 505–506, 441, 445, 449
  See application file for complete search history.

(56) References Cited

U.S. PATENT DOCUMENTS

| | | | |
|---|---|---|---|
| 4,240,102 A * | 12/1980 | Groeneweg | 348/558 |
| 4,286,281 A * | 8/1981 | Suzuki | 386/12 |
| 4,933,749 A * | 6/1990 | Van Lammeren et al. | 348/558 |
| 5,283,637 A * | 2/1994 | Goolcharan | 348/14.12 |
| 5,319,453 A * | 6/1994 | Copriviza et al. | 346/6 |
| 5,389,977 A * | 2/1995 | Lee | 348/614 |
| 5,784,117 A * | 7/1998 | Mitarai et al. | 348/558 |
| 5,790,096 A * | 8/1998 | Hill, Jr. | 345/600 |
| 5,835,157 A * | 11/1998 | Miyazaki et al. | 348/558 |
| 6,154,257 A * | 11/2000 | Honda et al. | 348/558 |
| 6,377,629 B1 * | 4/2002 | Stewart et al. | 375/257 |
| 6,618,774 B1 * | 9/2003 | Dickens et al. | 710/64 |
| 6,904,110 B2 | 6/2005 | Trans et al. | |

(Continued)

FOREIGN PATENT DOCUMENTS

EP    0 483 467 A2    6/1992

(Continued)

OTHER PUBLICATIONS

International Search Report-WO mailed Mar. 14, 2008.

*Primary Examiner*—Paulos M Natnael
(74) *Attorney, Agent, or Firm*—The Hecker Law Group, PLC

(57) ABSTRACT

A video format identification system includes a master clock circuit which provides timing and counting signals, a synchronization activity detector operatively coupled to the master clock circuit, and a synchronization width qualifier configured to filter out noise or reference burst signals from showing up as sync signals. The system also includes a synchronization detector which regulates the rate of the incoming sync signal, a color burst sampler providing a window for sampling a reference color burst after the sync signal has occurred, and a color burst detector which looks for at least three transitions from a burst signal before it qualifies the as an appropriate reference color burst. A format sample timer generates sample clock signals. A format sample counter produces "take format" signals which are utilized by a set of format counter. The system further includes a video format identifier which enables a particular video format to be directed to a respective video connector.

14 Claims, 14 Drawing Sheets

U.S. PATENT DOCUMENTS

| | | | |
|---|---|---|---|
| 6,947,096 B2 * | 9/2005 | Kumazawa | 348/488 |
| 7,047,556 B2 | 5/2006 | Cole et al. | |
| 7,119,847 B2 * | 10/2006 | Meiners | 348/558 |
| 7,324,167 B2 * | 1/2008 | Miller | 348/723 |
| 7,365,796 B1 * | 4/2008 | Woodall | 348/508 |
| 7,365,798 B2 * | 4/2008 | Nashida | 348/558 |
| 2002/0140818 A1 | 10/2002 | Rowe | |
| 2005/0134736 A1 | 6/2005 | Meiners | |
| 2005/0185093 A1 | 8/2005 | Nashida | |
| 2006/0170776 A1 * | 8/2006 | Scott et al. | 348/192 |
| 2008/0063090 A1 * | 3/2008 | Smiley | 375/257 |

FOREIGN PATENT DOCUMENTS

| | | |
|---|---|---|
| GB | 2 247 813 | 3/1992 |

* cited by examiner

| Pin | RGBHV | RGBS | RsGsBs | RGsB | Component | S-Video | Composite |
|---|---|---|---|---|---|---|---|
| 1 | Red / V Sync + | Red + | Red / Sync + | Red + | R-Y + | | |
| 2 | Red / V Sync - | Red - | Red / Sync - | Red - | R-Y - | | |
| 3 | Digital / Power + | Digital / Power + | Digital / Power + | Digital / Power + | Digital / Power + | Digital / Power + | Digital / Power + |
| 4 | Green + | Green + | Green / Sync + | Green / Sync + | Y + | Y + | Video + |
| 5 | Green - | Green - | Green / Sync - | Green / Sync - | Y - | Y - | Video - |
| 6 | Digital / Power - | Digital / Power - | Digital / Power - | Digital / Power - | Digital / Power - | Digital / Power - | Digital / Power - |
| 7 | Blue / H Sync + | Blue / C Sync + | Blue / Sync + | Blue + | B-Y + | C + | |
| 8 | Blue / H Sync - | Blue / C Sync - | Blue / Sync - | Blue - | B-Y - | C - | |

FIG. 2

| Pin | Signals |
|---|---|
| 1 | Composite Video + |
| 2 | Composite Video - |
| 3 | Digital / Power + |
| 4 | Y + |
| 5 | Y - |
| 6 | Digital / Power - |
| 7 | C + |
| 8 | C - |

FIG. 3

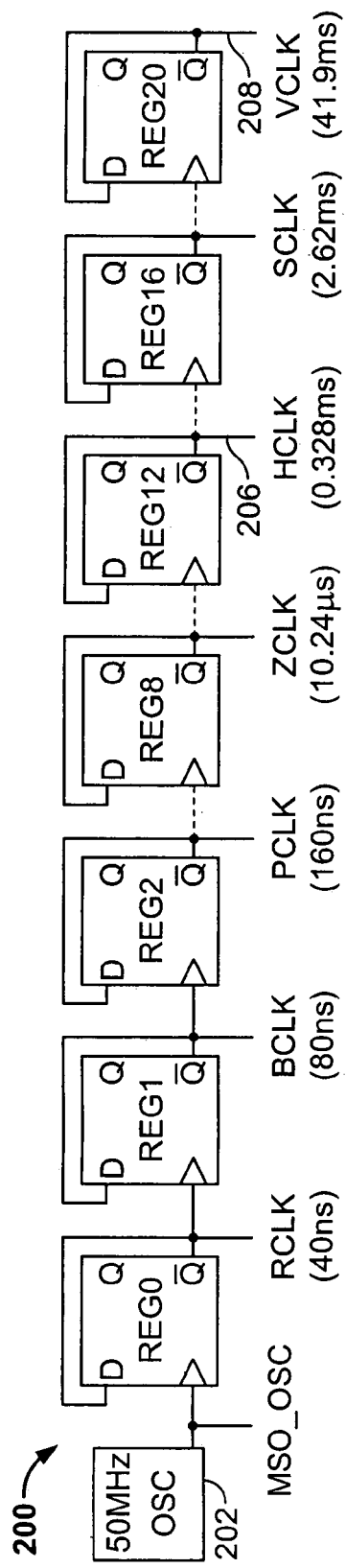
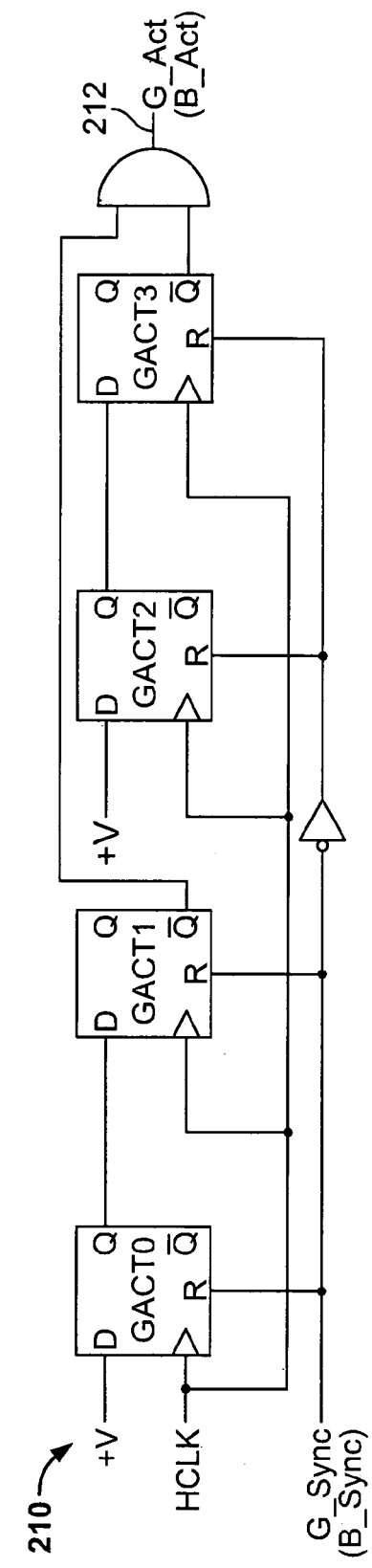
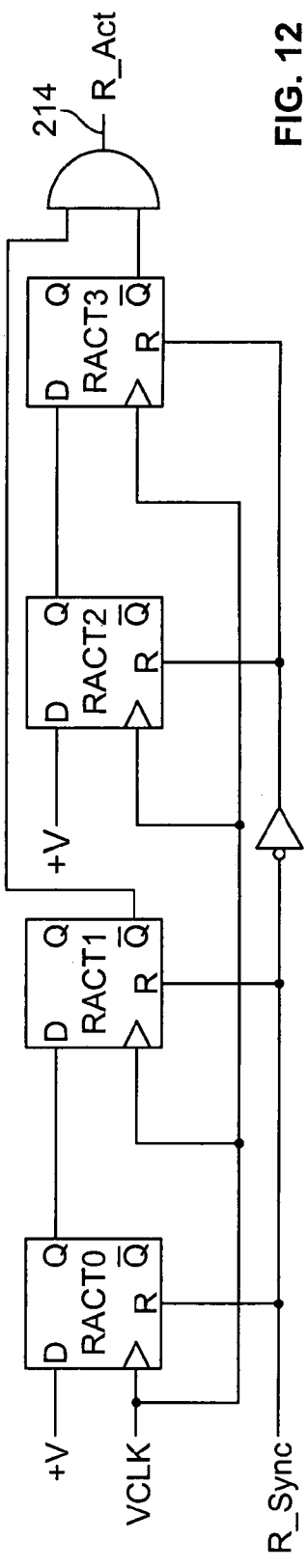
FIG. 11
FIG. 12

AUTOMATIC VIDEO FORMAT IDENTIFICATION SYSTEM

FIELD OF THE INVENTION

The present invention relates to communication systems. More specifically, the invention relates to an automatic video format identification system.

BACKGROUND

Transmission cables are used to convey electronic signals from a source device to a destination device, e.g., a display terminal. The cable may not accurately convey the signals because of losses which accumulate along the cable path. These losses are primarily due to the physical characteristics of the transmission cable and sometimes due to imperfections in the cable construction. The imperfections may not necessarily be due to manufacturing deficiencies, but may also be due to the fact that a cable is a physical device and most physical devices exhibit some losses when a signal is conveyed through them. Thus, longer length transmission cables tend to exhibit more loss (also known as "cable insertion" loss) than shorter length cables. A length limit exists for each transmission cable medium after which a video signal may no longer be discernable.

Video may be transmitted either in digital or analog format. For digital video transmission such as computer video, cable insertion loss is generally not an issue because the digital signal can be recovered so long as discernable digital pulses are detected by a receiver. A pulse-detection method and apparatus is described, for example, in commonly owned U.S. patent application Ser. No. 11/897,547 entitled "Method and Apparatus for Improving the Quality of a Transmitted Video Signal," which was filed with the U.S. Patent and Trademark Office on Aug. 29, 2007 and the specification of which is incorporated herein in its entirety by reference. For analog signals such as NTSC (National Television Standards Committee) video signals, the signal comprises varying voltages with the voltages being affected by wire length, connectors, heat, cold, materials, manufacturing processes, and/or other conditions.

Cable insertion loss varies with the type of transmission medium. For instance, coaxial cables are known to exhibit less insertion loss than twisted pair cables, thus coaxial cables are the medium of choice for video transmission. Also, because of its superior performance over twisted pair cables, coaxial cables are typically used for transmission of high resolution (i.e., broadband) video signals. However, coaxial cables are more expensive and difficult to install when compared to twisted pair cables.

Historically, the significant differences between coaxial and twisted pair cables limited twisted pair cables to transmission of low-resolution video (i.e., less than 10 MHz) signals. However, twisted pair cables have a distinct advantage over coaxial cables, namely, the cost/performance ratio. Dollar-for-dollar, twisted pair cables are significantly cheaper to purchase and/or install than coaxial or fiber optic cable. A standard twisted pair cable contains four pairs of conductors in a single cable so that the actual cost per pair is one-quarter of the per-foot price.

Analog video specifications such as C-Video, S-Video, or YUV (or YIQ) may be available in various color models. A color model (also known as "color space") defines colors in some standard, generally accepted way. For example, the RGB color model includes R for the red component; G for the green component; and B for the blue component.

Data-grade twisted pair cable comes in two types: unshielded twisted pairs commonly called UTP, and STP (shielded twisted pairs). By far, most of the domestic data installations tend to employ UTP cables.

In the mid 1980's, twisted pair technology began to emerge which could transmit 2 Mbps (Megabits per second), then 4 Mbps (the original IBM data rate), and then 10 Mbps. As data rates increased, it became apparent that some means of assessing twisted pair cable performance was needed. It was at that time that a system of "Levels" was proposed. The TIA (Telecommunications Industry Association)/EIA (Electronics Industries Alliance), two groups that set standards for the communications industry, adopted the proposal and separated the data rates and other parameters into "Categories", such as Category (CAT) 3, 4, 5, and 6. Each higher numbered category has more stringent requirements with higher data rates and higher performance than the previous category.

The specifications for each category are given in TIA/EIA-568-B. TIA/EIA-568-B is a set of three telecommunications standards published by the TIA. The standards address commercial building cabling for telecommunication products and services. The three standards are formally titled ANSI/TIA/EIA-568-B.1-2001, -B.2-2001, and -B.3-2001. The TIA/EIA-568-B standards were first published in 2001 and supersede the TIA/EIA-568-A standards set, which is now obsolete. For example, the TIA/EIA-568-B.1-2001 defines the pin/pair assignments for eight-conductor 100-ohm balanced twisted pair cabling. These assignments are named T568A and T568B.

With regard to appearance, present-day twisted pair cables look identical to POTS (Plain Old Telephone Service) cable. The cables use the same color code, come in many of the same pair counts and use the same gauge conductors. However, the specifications they are made to, the materials used to make them, and the requirements to connect them, become more and more critical as data rates increase.

The 4th pair of a CAT 5, 6, or 7 wire bundle may be used to convey power and digital communications between a transmitter to a receiver, and digital communications from the receiver to the transmitter. The digital communications have identification bits, which identify the transmitting device. A number of transmitters may transmit into the same communication link. Collision may be detected by CRC (Cyclic Redundancy Check) error checks.

High-resolution analog video such as RGB requires that each color component be transmitted separately to a destination device. For such transmission, a coaxial cable setup will require three separate coaxial cables to carry each color component and another cable to carry audio data. In contrast, a twisted pair setup only requires one twisted pair cable for all the video components, and a spare pair of conductors for audio and other communication needs. For instance, each of the three color components of the RGB format video may use one out of the four twisted pair conductors in the cable bundle, and the last (i.e. fourth) twisted pair may be used for power and/or digital communication needs. Thus, twisted pair bundles have a clear advantage over coaxial cables in terms of installation and costs.

Various methods for compensation of signal transmission errors have been used. Specifically, methods and apparatuses to compensate for phase, DC error, AC loss, and skew error are described, for example, in commonly owned U.S. patent application Ser. No. 11/309,120, filed Jun. 23, 2006, and entitled "Method and Apparatus for Automatic Compensation of Skew in Video Transmitted over Multiple Conductors," U.S. patent application Ser. No. 11/309,123, filed Jun. 23, 2006, and entitled "Method and Apparatus for Automatic Reduction of Noise in Video Transmitted over Conductors," U.S. patent application Ser. No. 11/309,558, filed Aug. 22, 2006, and entitled "Method and Apparatus for DC Restoration Using Feedback," U.S. patent application Ser. No. 11/557,938, filed Nov. 7, 2006, and entitled "Method and Apparatus for Video Transmission over Long Distances Using Twisted Pair Cables," and U.S. patent application Ser. No. 11/309,122, filed Jun. 23, 2006, and entitled "Method and Apparatus for Automatic Compensation of Video Signal Losses from Transmission over Conductors," the specifications of which are incorporated herein in their entirety by reference.

The need exists for a video format identification system which can automatically identify the various video signal formats and switch the transmitted video signal to the proper output connector. Such system should preferably be capable of simultaneously transmitting and recovering video, audio, communication and power signals over at twisted pair cable bundle.

SUMMARY OF THE INVENTION

Some embodiments disclosed herein are generally directed to an automatic video format identification system.

In accordance with one aspect of the present invention, the video format identification system comprises a master clock circuit which provides timing and counting signals, a synchronization activity detector operatively coupled to the master clock circuit, and a synchronization width qualifier configured to filter out noise or reference burst signals from showing up as sync signals. The system also comprises a synchronization detector which regulates the rate of the incoming sync signal, a color burst sampler providing a window for sampling a reference color burst after the sync signal has occurred, and a color burst detector which looks for at least three transitions from a burst signal before it qualifies the as an appropriate reference color burst. A format sample timer generates sample clock signals. A format sample counter produces "take format" signals which are utilized by a set of format counter. The system further comprises a video format identifier which enables a particular video format to be directed to a respective video connector.

These and other aspects of the invention will become apparent from a review of the accompanying drawings and the following detailed description of the invention.

BRIEF DESCRIPTION OF THE DRAWINGS

The present invention is generally shown by way of reference to the accompanying drawings in which:

FIG. 2 is a schematic illustration of an exemplary allocation of conductors of a twisted pair cable for various video formats in accordance with an embodiment of the present invention;

FIG. 3 is a schematic illustration of another exemplary allocation of conductors of a twisted pair cable for various video formats in accordance with an embodiment of the present invention;

FIG. 11 is a schematic illustration of a master clock circuit in accordance with an embodiment of the present invention;

FIG. 12 is a schematic illustration of a sync activity detector in accordance with an embodiment of the present invention;

DETAILED DESCRIPTION OF THE INVENTION

The detailed description set forth below in connection with the appended drawings is intended as a description of illustrated exemplary embodiments and is not intended to represent the only forms in which these embodiments may be constructed and/or utilized. The description sets forth the functions and sequence of steps for constructing and operating the present invention in connection with the illustrated embodiments. However, it is to be understood that the same or equivalent functions and/or sequences may be accomplished by different embodiments that are also intended to be encompassed within the spirit and scope of the present invention.

Some embodiments of the present invention will be described in detail with reference to an automatic video format identification system, as generally depicted in reference to FIGS. 1-22. Additional embodiments, features and/or advantages of the invention will become apparent from the ensuing description or may be learned by practicing the invention. In the attached figures, the various drawings are not to scale with like numerals referring to like features throughout both the drawings and the description.

Figure 1:
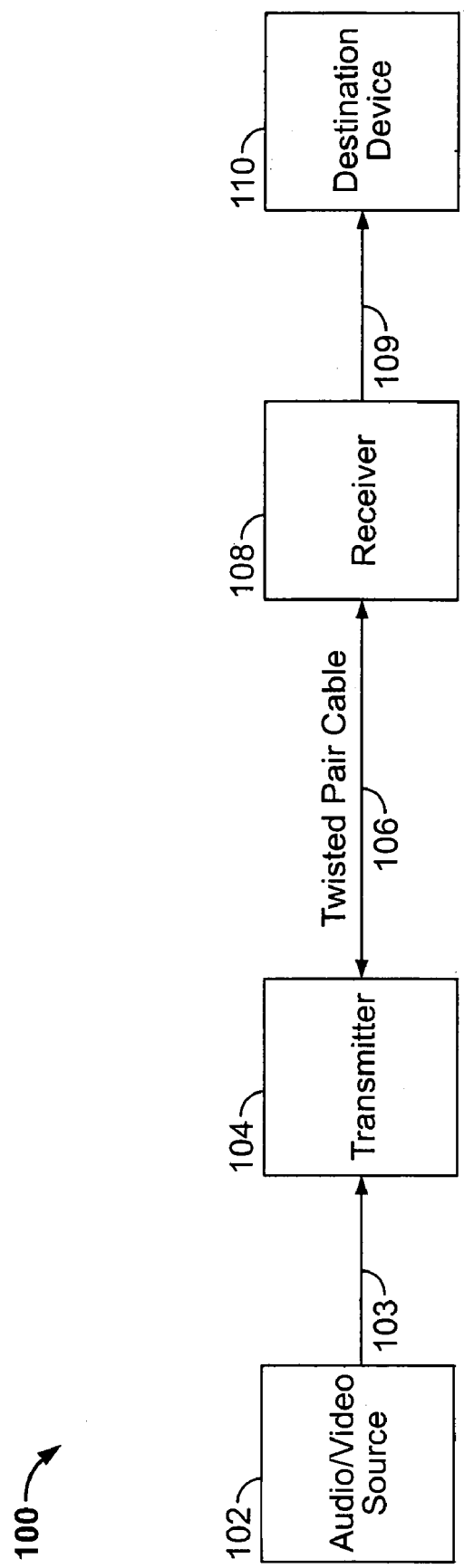
FIG. 1 is a block diagram of a system configured for audio/video communication over long distances using twisted pair cable in accordance with an embodiment of the present invention.

FIG. 1 is a block diagram of a system 100 configured for audio/video communication over twisted pair cable in accordance with an embodiment of the present invention. In one or more embodiments of the present invention, audio/video communication system 100 includes a transmitter 104 which is operatively coupled between an audio/video source 102 and a receiver 108. Transmitter 104 is configured to accept and process most audio and video formats originating from audio/video source 102 over transmission cable bundle 103. Transmitter 104 communicates with receiver 108 via a twisted pair cable 106.

Transmitter 104 receives video and audio signals from audio/video source 102, processes the same and differentially transmits output signals over twisted pair cable 106. Each of transmitter 104 and receiver 108 may include circuits for bi-directional digital communication. Bi-directional communication may be necessary to request a resend of data when the transmitted data is corrupted.

Transmission cable bundle 103 may include any combination of conductors suitable for coupling video and/or audio signals from source 102. The video conductors may include, but are not limited to, VGA cables, coaxial cables, twisted pair cables and/or the like for carrying composite video, S-Video and high resolution computer-video. If configured as audio cables, such cables may include two high fidelity audio conductors separately carrying the left and right audio channels.

Transmitter 104 may be configured with a composite video input on a female BNC (bayonet Neill-Concelman) connector, an S-Video input on a female 4-pin mini DIN, a computer-video input on a female 15-pin HD High Definition) connector, and audio connectors. The audio connectors may be RCA type connectors for carrying any standard audio patch cables, as needed.

Twisted pair cable 106 may be configured as a single twisted pair cable bundle or multiple twisted pair cable bundles, depending on the desired configuration of transmitter 104 and receiver 108. Multiple twisted pair cable bundles may be desirable for transmission of different video formats. For example, one twisted pair cable bundle may be used for RGB output while a second twisted pair cable bundle is utilized for AV output. The connectors on both ends of the cables may be similar, e.g., male RJ-45 connectors to mate with female RJ-45 connectors on the transmitter and receiver sides.

FIG. 2 is an illustration of an exemplary allocation of conductors of twisted pair cable bundle 106 for various video formats in accordance with an embodiment of the present invention. Each twisted pair cable bundle may include four pairs of conductors, although in other embodiments different number of conductor pairs may be utilized. Specifically, the first conductor pair may include Pins 1 and 2; the second conductor pair may include Pins 4 and 5; the third conductor pair may include Pins 7 and 8; and the fourth conductor pair may include Pins 3 and 6.

The fourth pair (i.e. Pins 3 and 6), for example, may be used for digital communication and power transfer. Power transfer may be necessary between transmitter 104 and receiver 108 when the location of one of the devices (i.e. transmitter or receiver) is too remote from an external power source. In some installations, receiver 108 may be located in close proximity to a destination device 110 (e.g. a projector) and may have easy access to the power source used to power destination device 110. In such case, it may become necessary to transfer power from receiver 108 to transmitter 104, which may be located far away from the projector power source. Destination device 110 receives input from receiver 108 via transmission cable bundle 109, as generally shown in FIG. 1.

Conductor pairs may also be allocated as further illustrated in reference to FIG. 2 or FIG. 3, depending on video format. Note that the pin allocations used herein are for illustrative purposes and convenience in separating the color components. For instance, with RGB video, the signals may be allocated such that Pins 1 and 2 carry the differential Red signals (i.e. Red+ and Red−), Pins 4 and 5 carry the differential green signals (i.e. Green+ and Green−), Pins 7 and 8 carry the differential Blue signals (i.e. Blue+ and Blue−), and Pins 3 and 6 carry Digital/Power+ and Digital/Power−, respectively.

The sync signals may be summed with the respective color components, as illustrated. For example, when the format to be transmitted is RGBHV (i.e. RGB with separate horizontal and vertical sync signals), the Vertical Sync signal is summed with the Red signal (i.e. Red/V Sync+ and Red/V Sync−); and the Horizontal Sync signal is summed with the Blue signal (i.e. Blue/H Sync+ and Blue/H Sync−). When the format to be transmitted is RGBS (i.e. RGB with one composite sync signal), the composite sync signal may be summed with the Blue signal (i.e. Blue/C Sync+ and Blue/C Sync−).

When the format to be transmitted is RsGsBs (i.e. each color component has its own sync signal), the sync signals are summed with the respective color component signals, as shown in FIG. 2. When the format to be transmitted is RGsB (i.e. only the Green color component has its own sync signal), the differential sync signals are summed with the corresponding green color signal, as shown in FIG. 2.

Component video signals may be allocated such that Pins 1 and 2 carry the differential Red signals (i.e. R−Y+ and R−Y−); Pins 4 and 5 may carry the differential luminance signals (i.e. Y+ and Y−); and Pins 7 and 8 may carry the differential Blue signals (i.e. B−Y+ and B−Y. For S-Video, the signals may be allocated such that Pins 1 and 2 are not used for video; Pins 4 and 5 may carry the differential luminance signals (i.e. Y+ and Y−); and Pins 7 and 8 may carry the differential Chrominance signals (i.e. C+ and C−). For Composite Video, the signals may be allocated such that Pins 1, 2, 7, and 8 are not used; and Pins 4 and 5 carry the differential video signals (i.e. Video+ and Video−).

In another embodiment of the present invention, Composite video and S-Video signals may share the same twisted pair cable, as illustrated in FIG. 3. Particularly, the composite video signals may be allocated such that Pins 1 and 2 carry the differential video signals (i.e. "Composite Video"+ and "Composite Video"−); Pins 4 and 5 carry the differential luminance signals (i.e. Y+ and Y−); and Pins 7 and 8 carry the differential Chrominance signals (i.e. C+ and C−). Pins 3 and 6 carry power and digital communication signals, as needed.

The following table illustrates which conductor pair of twisted pair cable 106 may contain a synchronization ("sync") and/or color burst signals for a particular video format, in accordance with an exemplary embodiment of the present invention.

|  | Composite Trans. 1 | Composite Trans. 2 | S-Video Trans. 1 | S-Video Trans. 2 | Component | RGBHV | RGBS |
| --- | --- | --- | --- | --- | --- | --- | --- |
| RED (Pair1&2) |  | H & V BURST | BURST | H & V |  | V |  |
| GREEN (Pair4&5) | H & V BURST |  | H & V | BURST | H & V |  |  |
| BLUE (Pair7&8) |  |  |  |  |  | H | H & V |

As shown hereinabove, for RGBHV & RGBS formats, the V (Vertical) and H (Horizontal) sync signals may be added to the Red & Blue color pairs, respectively, in transmitter 104.

In the above table, "BURST" refers to a color burst signal, "Trans. 1" refers to a newer video format transmitter, and "Trans. 1" refers to an old video format (low resolution) transmitter. In composite video, the color burst signal is used to keep the chrominance subcarrier synchronized in a color television signal. By synchronizing an oscillator with the color burst at the beginning of each scan line, a television receiver can restore the suppressed carrier of the chrominance signals and decode the color information. The Composite, S-Video & Component formats are passed through (after being DC restored) to the color pairs as listed hereinabove in tabular form.

DC restoration is a common video function which is employed when AC-coupled signals have lost their DC reference and must have it periodically reset in order to retain brightness information. It is fairly common in video transmission systems to AC-couple the analog video input signal into a given device. This allows the receiving device to set its own optimal DC bias level independently of the driving signal's DC bias level. For instance, the receiving device may set the analog signal's common mode level around $V_{CC}/2$ to optimize its headroom while processing the signal. The receiving device may also match the clamped level to a DC reference voltage so as to allow for stable DC output voltage.

Figure 4:
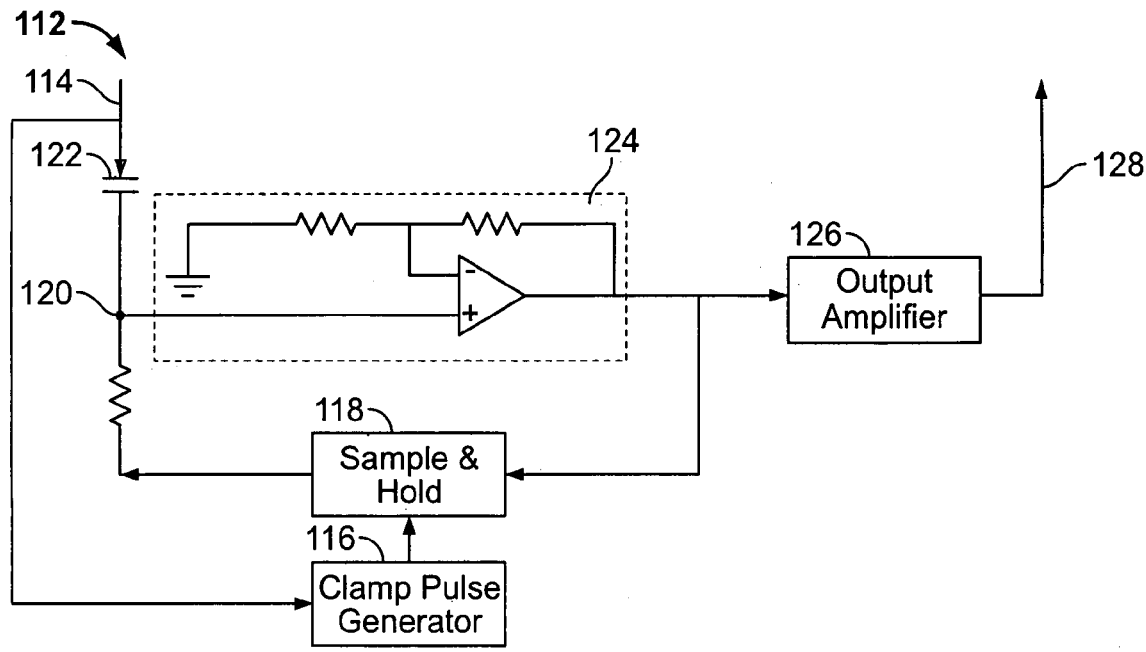
FIG. 4 depicts a DC restoration circuit in accordance with an embodiment of the present invention.

In one or more embodiments of the present invention, the video signal at transmitter 104 is DC restored, i.e. referenced to ground, before being sent out to receiver 108 on twisted pair cable 106 (FIG. 1). As generally depicted in FIG. 4, DC restoration circuit 112 functions by sampling the back porch of incoming video signal 114 and referencing this signal to ground level. A clamp pulse generator 116 detects the incoming synchronization signal, whether a combined Sync-On-Green or a separate RGB sync signal. Once the synchronization signal is detected, a clamp pulse is generated at the appropriate time to sample the back porch of the video signal. A sample-and-hold circuit 118 provides the correct offset voltage to summing node 120 (FIG. 4) to compensate for the signal offset. The other voltage at summing node 120 is provided by input capacitor 122 (FIG. 4). The resulting voltage signal is passed through video amplifier 124 (FIG. 4) and output amplifier 126 (FIG. 4) which restores the output signal (128) to its proper DC voltage level with respect to ground. Offset corrected output 128 is shown in reference to FIG. 4. In one or more embodiments, output amplifier 126 (FIG. 4) may be capable of offset correction. The video signal may be adjusted in amplitude and peaking to compensate for signal transmission loss across the length of twisted pair cable 106.

With the video signal D.C. restored at transmitter 104, the sync & color burst signals may be detected in receiver 108 by way of voltage comparators that are referenced to the appropriate voltage levels. In one or more embodiments of the present invention, receiver 108 is configured to detect in which color pair(s) the sync & reference burst signals may be present.

Figure 5:
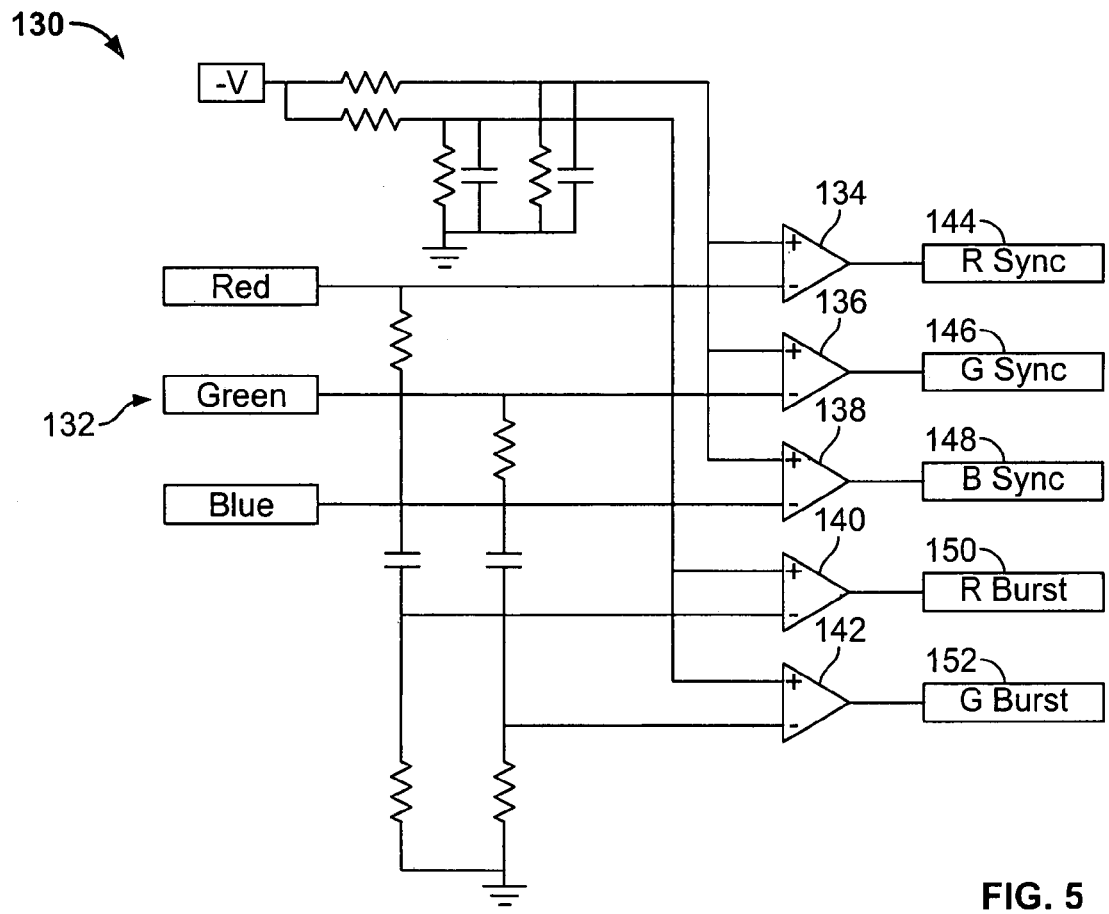
FIG. 5 shows a synchronization and reference burst detection circuitry in accordance with an embodiment of the present invention.

FIG. 5 schematically shows a sync and reference burst detection circuitry 130 utilized in accordance with the general principles of the present invention. The video signals, after compensation, are amplified and input on Red, Green and Blue as shown at reference numeral 132. As depicted in reference to FIG. 5, two reference level voltages are established; one for detecting the synchronization signals and another one for detecting the reference burst signals. In this regard, comparators 134, 136 and 138 are DC coupled to detect with which colors the sync signals are associated. Comparators 140 and 142 (FIG. 5) are AC coupled to detect with which color the color burst signal is associated. Digital video signals 144, 146, 148, 150 and 152 (FIG. 5) are output from their respective comparators to a video format identification logic circuit configured in accordance with the present invention. Such a circuit may be implemented as a CPLD (Complex Programmable Logic Device) or FPGA (Field-Programmable Gate Array) using counters and registers. In the former case, the input signals to the CPLD would be G_Sync (Sync. on Green Detection), R_Sync (Sync. on Red Detection), B_Sync (Sync. on Blue Detection), GBrst (Reference Burst on Green Detection), RBrst (Reference Burst on Red Detection), Tri_Lvl (Tri-Level Detection), Rst (System Reset) and M50_Osc (50 MHz Oscillator). All the detection signals come from comparators which are referenced with the appropriate voltage levels for the video signal.

To qualify the video format the video signal is analyzed extensively using timing counters for width of sync signals as well as position & frequency of reference burst signals. Also tri-level sync signals are detected, which would enable component video output in addition to the non-tri-level component video signals.

In one or more embodiments of the present invention, the CPLD uses a master clock circuit 200 as a source for timing and counting signals, as generally shown in reference to FIG. 11. For example, master clock circuit 200 may include an oscillator 202 (FIG. 11) and a plurality of binary counters, in which each stage divides the previous stage frequency in half (twice the time). In one exemplary embodiment, master clock circuit 200 uses twenty-one (21) binary counters and a 50 MHz oscillator. A person skilled in the art would appreciate that timing is critical in this case. HCLK signal 206 (FIG. 11) is selected to guarantee that at least one horizontal sync signal would occur between its rising edges. VCLK signal 208 (FIG. 11) similarly is selected to guarantee that at least one vertical sync signal will occur between its rising edges.

In another embodiment of the present invention, the CPLD utilizes a sync activity detector 210 (FIG. 12). Sync activity detector 210 is configured so that its outputs (G_ACT, B_ACT) 212 and (R_ACT) 214 would be active if there are transitions between high and low levels within appropriate time intervals. In one exemplary embodiment, the horizontal signals may appear on Green or Blue video. These signals are monitored for activity using the HCLK clock. The Vertical sync signal for RGBHV is added to the Red video signal and is qualified with the VCLK clock. Thus, if the sync is not present or the video signal is consistently high or low level, the activity signals will be inactive (low level). This condition may serve as the first qualifier for synchronization signals in accordance with the invention.

Figure 13:
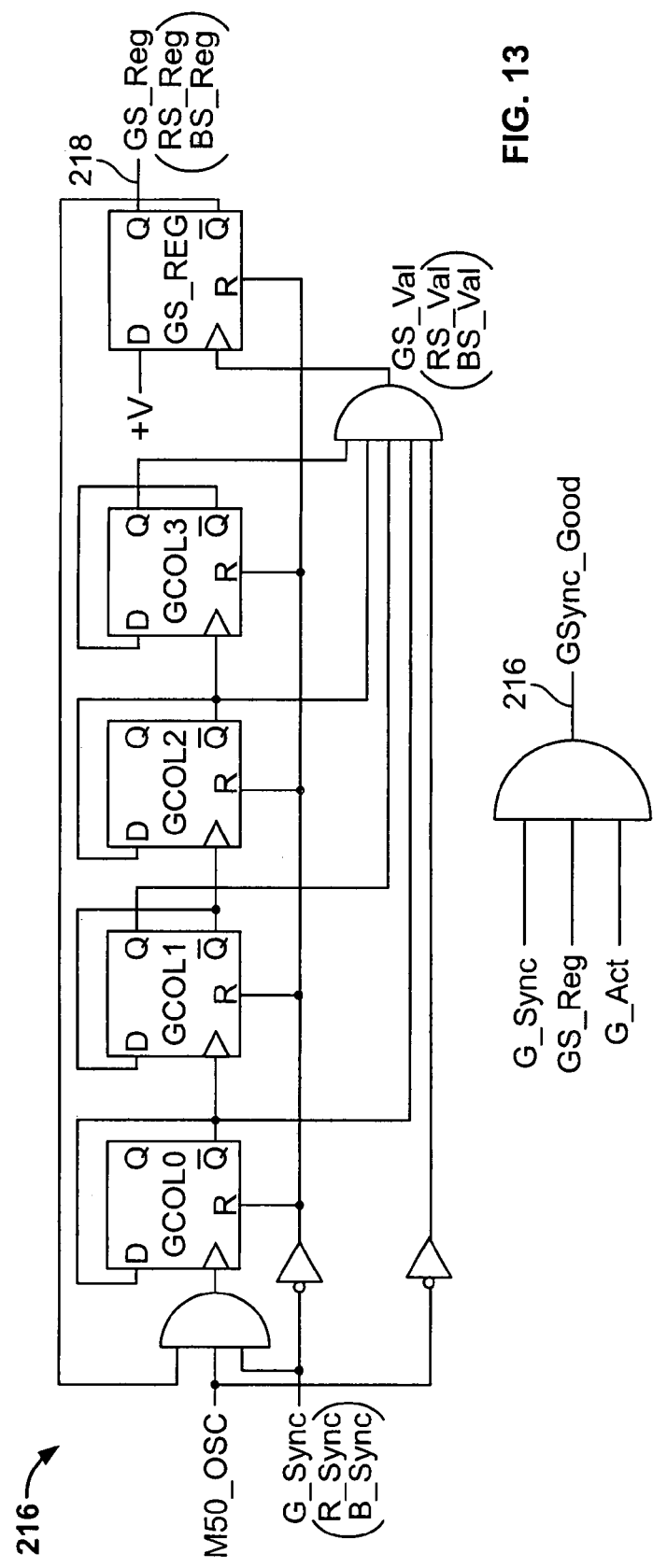
FIG. 13 is a schematic illustration of a sync width qualifier circuitry in accordance with an embodiment of the present invention.

In yet another embodiment of the present invention, the CPLD may use sync width qualifier circuitry 216 (FIG. 13). Sync width qualifier circuitry 216 is configured to filter out noise or a reference burst signal from accidentally showing up as a sync signal. In one exemplary embodiment, any signal <200 ns would disable GS_Reg output 218 (FIG. 13). Conversely, any sync signal that is 200 ns or greater will clock the GS_Reg high which would provide a second qualifier for the synchronization signal.

Figure 14:
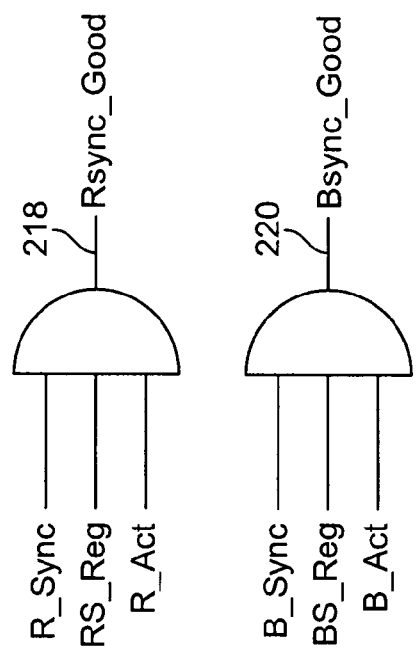
FIG. 14 schematically depicts the qualification of a sync signal in accordance with an embodiment of the present invention.

FIG. 14 generally depicts the qualification of a good sync signal showing up on the Red, Green, and/or Blue video lines. The GSync_Good, RSync_Good and BSync_Good signals (216, 218, 220) would pass the synchronization signal if the signal is "active" and "equal to or greater" than a pre-set minimum sync signal width, such as for example 200 ns.

Figure 15:
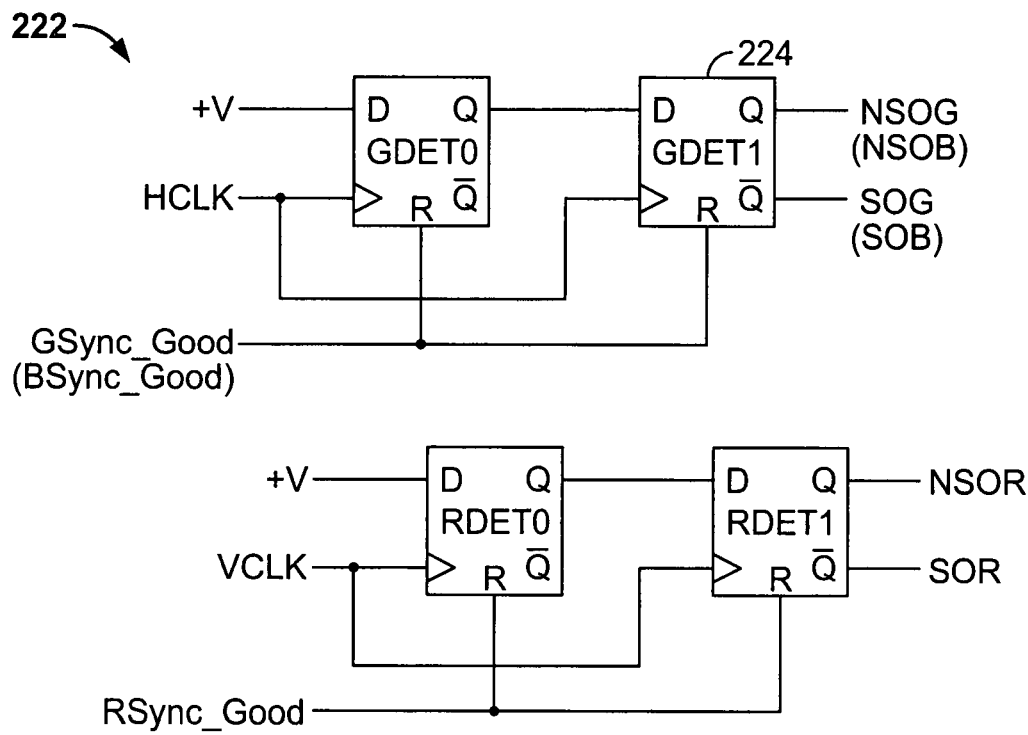
FIG. 15 is a schematic illustration of a synchronization detector in accordance with an embodiment of the present invention.

In still another embodiment of the present invention, the CPLD utilizes a synchronization detector 222 (FIG. 15). Synchronization detector 222 is the third, and last, sync qualifier which guarantees that the sync signal is coming in at the right rate, at least one sync within the appropriate HCLK or VCLK time. If the sync signals are not coming in fast enough or are not detected at all, GDet 1 register 224 (FIG. 15) would be clocked high and the NS (No Sync On color) signal would become active. Otherwise, the SO (Sync On color) signal would be active. These are the signals along with the reference burst signals that are used in determining the video format.

Figure 16:
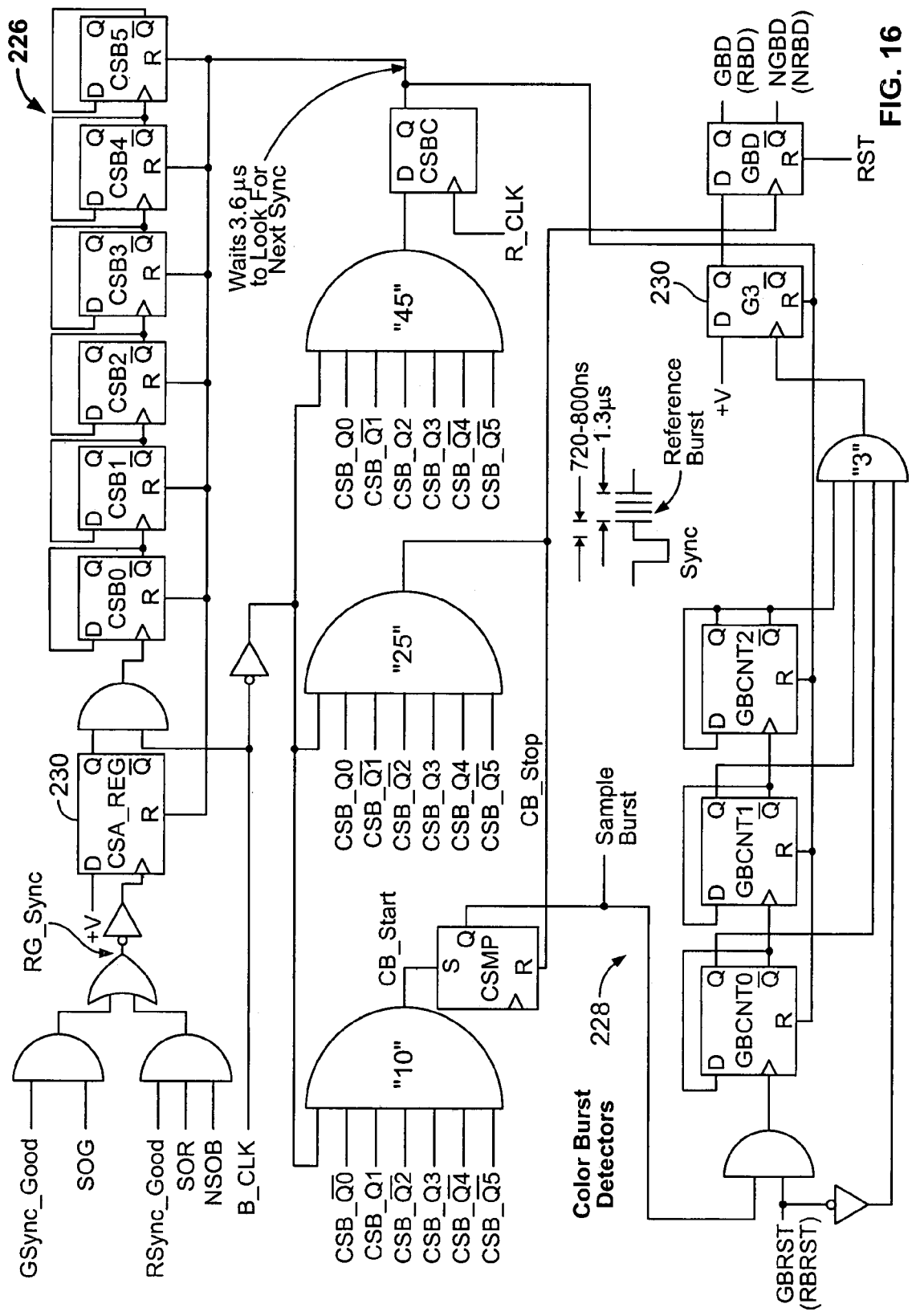
FIG. 16 is a schematic illustration of a color burst sampler and a color burst detector in accordance with an embodiment of the present invention.

The CPLD of the present invention may also utilize a color burst sampler 226 and a color burst detector 228, as schematically depicted in reference to FIG. 16. Color burst sampler 226 provides a window for sampling a reference color burst at the appropriate time after a synchronization signal has occurred. In one exemplary embodiment, with the event of the trailing edge of the Red or Green synchronization signal, CSA register 230 is clocked high enabling the CSB counter (timer) which would set (SB_Start) the Sample Burst register (CSMP) at 720 to 800 ns after the trailing edge of the sync signal. This allows color burst detector 228 to start looking in the appropriate place for at least three transitions from the burst signal before it is qualified as a good Reference Burst at which time G3 register 230 (FIG. 16) is clocked high.

When the window closes, after an additional 1.3 µs (CB_Stop), the G3 state is transferred to the GBD (RBD) register which qualifies a good reference burst. The color burst sampler continues counting up to "45" (3.6 µs) before resetting color burst sampler 226 to arm the circuit for the next sample. This allows the current reference burst to pass. Thus, the reference burst is qualified by a window at the location where a reference burst is specified and also counting a number of minimum transitions (3) to occur within that window.

Figure 17:
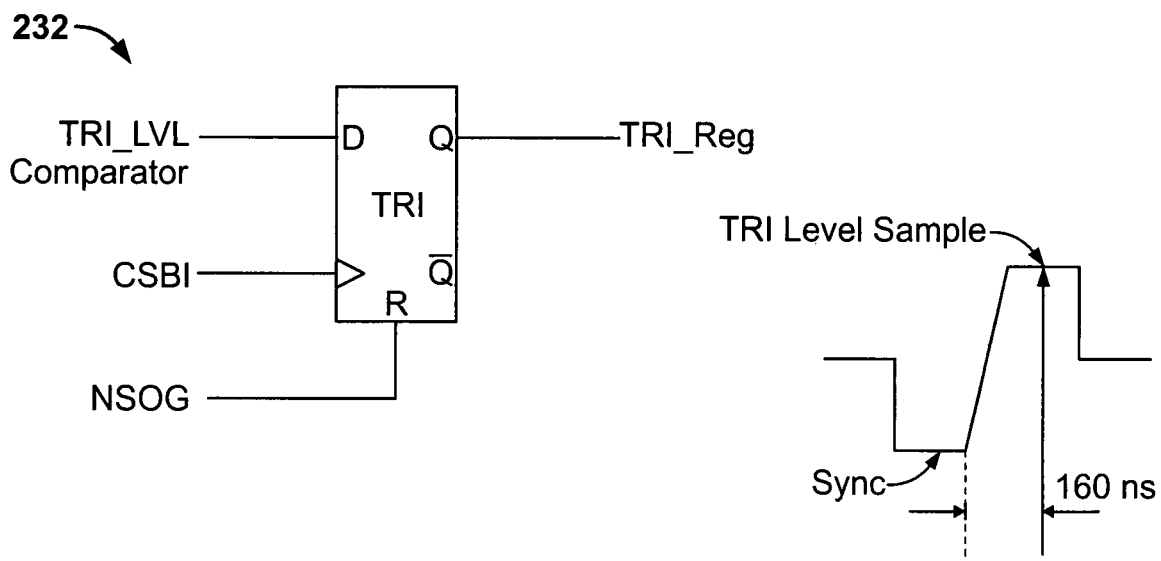
FIG. 17 is a schematic illustration of a tri-level detector in accordance with an embodiment of the present invention.

The CPLD of the present invention may further utilize a tri-level detector 232 (FIG. 17). If a synchronization signal is Tri-level it is defined as Component format. Component format video does not have to be Tri-level, for instance it can have normal synchronization without a reference burst on green and without any synchronization signal on red or blue. A positive voltage comparator is used to detect tri-level synchronization. A tri-level synchronization signal has a negative normal sync followed by the signal going to a high level. In one exemplary embodiment, since it may take some time to transition to a high level, the signal is not sampled until 160 ns after the trailing edge of the normal sync signal. The clock for the TRI register is taken from the CSB 1 time counter, as discussed in reference to FIG. 16 hereinabove. This provides the 160 ns timing after the normal sync signal.

Figure 18:
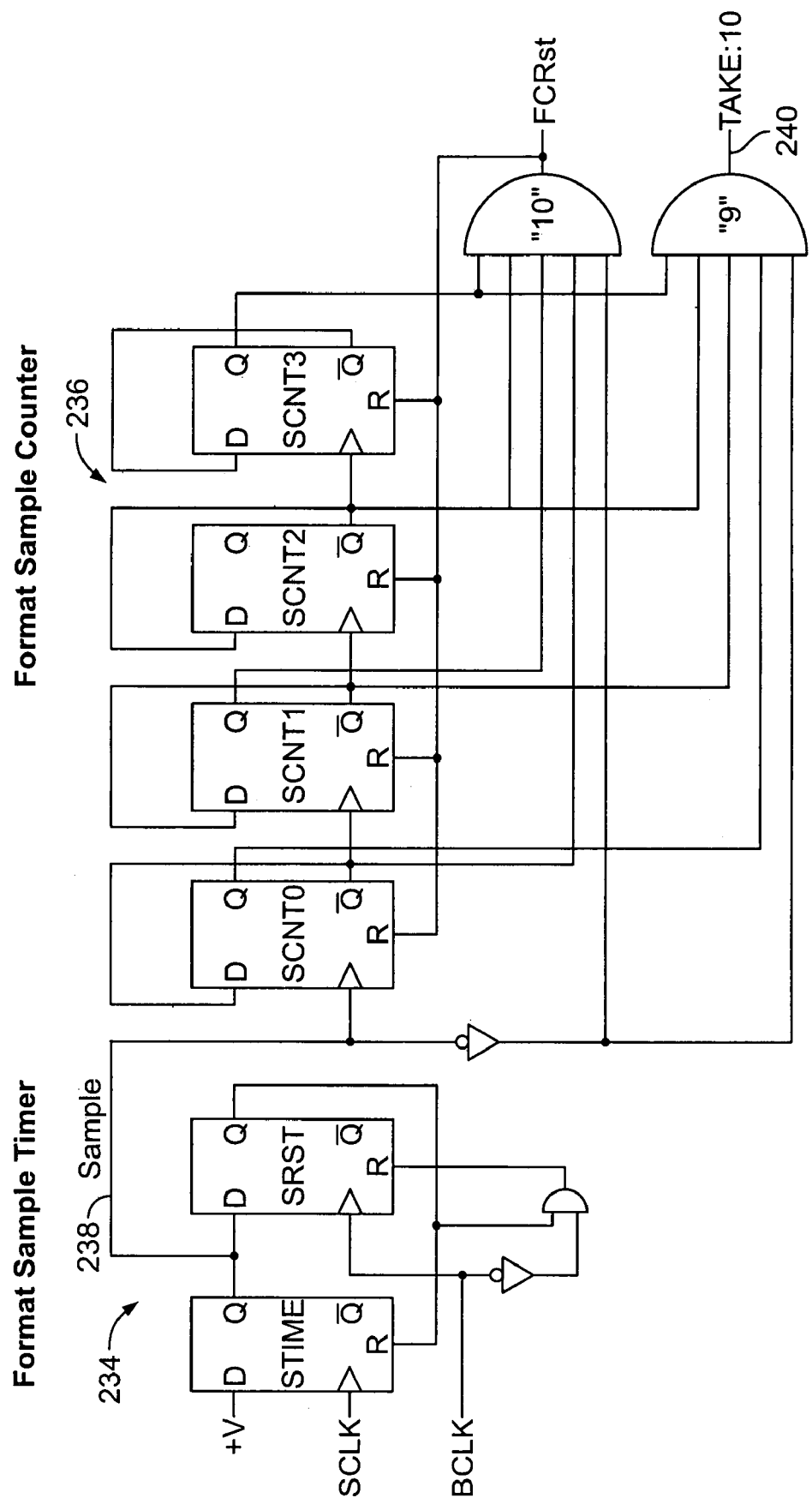
FIG. 18 is a schematic illustration of a format sample timer and a format sample counter in accordance with an embodiment of the present invention.

FIG. 18 generally depicts a format sample timer 234 and a format sample counter 236 which generate sample clocks (SAMPLE 238) and a take format signal 240 (TAKE 10), respectively. These signals are used by a plurality of format counters which are described herein below. In one exemplary embodiment, format sample timer 234 (FIG. 18) generates a sample clock every SCLK time (2.62 ms). Format sample counter 236 in turn provides a TAKE 10 signal (240) for every ten SAMPLE clocks (238). The sample interval ends when a counter reset signal (FCRst) becomes active on the eleventh count, starting the sample interval over again.

Figure 19:
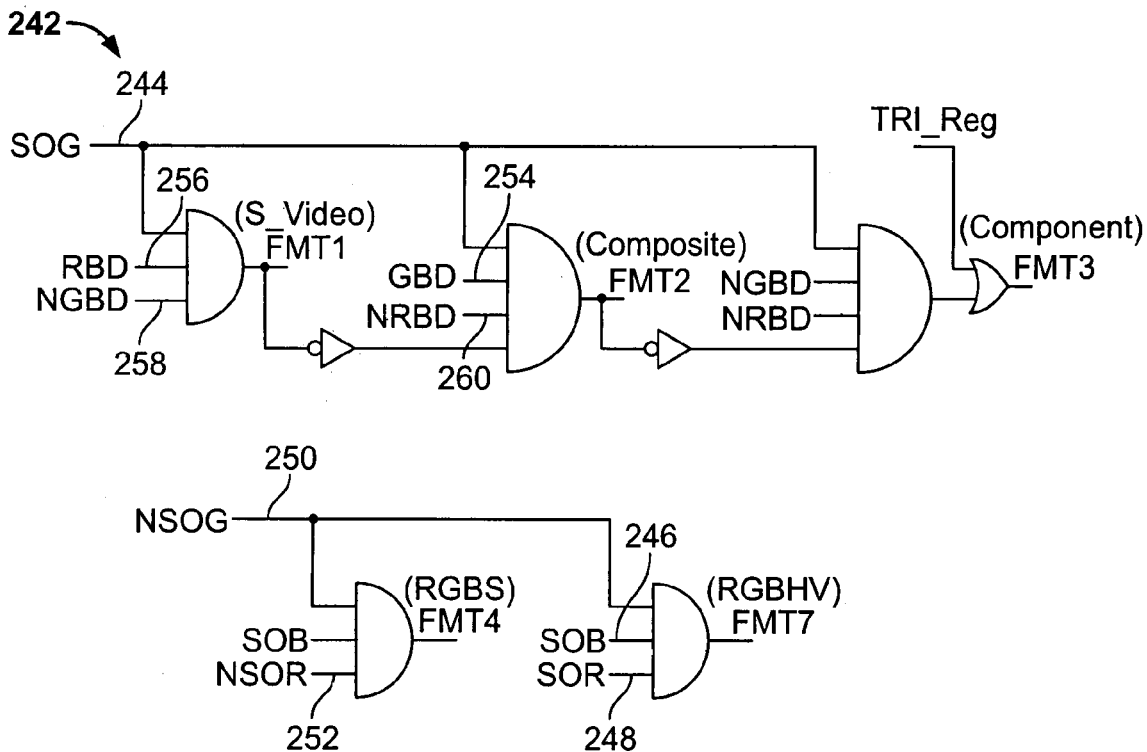
FIG. 19 is a schematic illustration of a format identifier in accordance with an embodiment of the present invention.

The CPLD of the present invention may also utilize a format identifier 242 (FIG. 19). Format identifier 242 is configured to qualify video formats by identifying unique combinations of sync and reference burst signals occurring on particular video color signals. A table of signal combinations is incorporated hereinabove. The input signals come from the sync and color burst detectors (FIGS. 15-16). SOG, SOB, SOR signals (244, 246, 248) refer to Sync on Green, Sync on Blue and Sync on Red, respectively, while the NSOG, NSOB, NSOR signals refer to No Sync on Green, No Sync on Blue and No Sync on Red, respectively. NSOG and NSOR signals are identified, for example, at reference numerals 250 and 252, respectively, in FIG. 19.

GBD signal 254 and RBD signal 256 refer to "reference burst signals on Green and Red", respectively. NGBD signal 258 and NRBD signal 260 (FIG. 19) refer to "no reference burst signals on Green and Red". While the five (5) video formats are shown, a person skilled in the art would recognize that the Component signal also is enabled with the tri-level detect signal.

Figure 20:
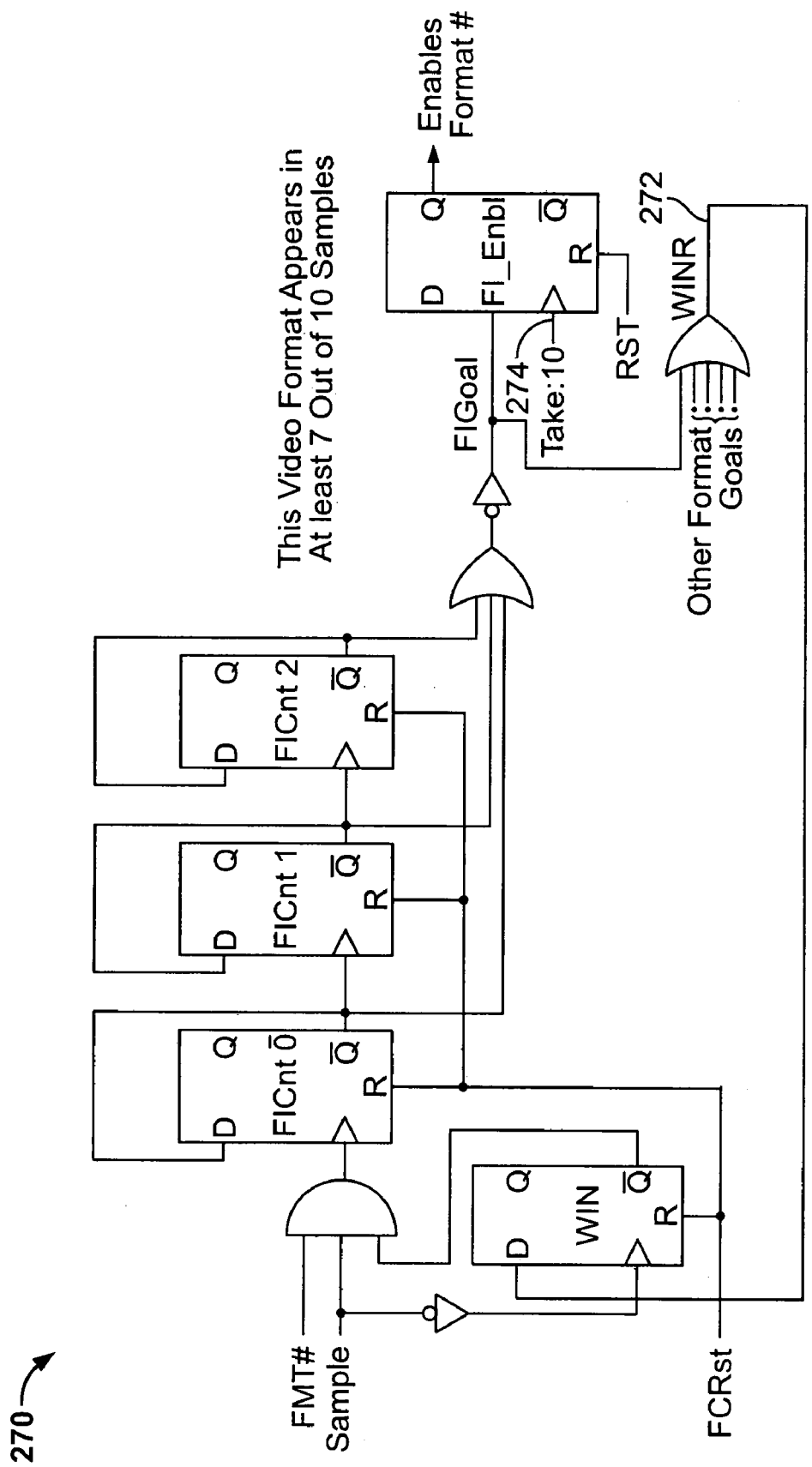
FIG. 20 is a block diagram of a plurality of format counters in accordance with an embodiment of the present invention.

FIG. 20 generally shows a plurality of format counters 270. Each of the five (5) video formats has its individual counter circuit. This provides an additional filter in case a false format is detected, e.g. during a Vertical sync period. In one exemplary embodiment, ten samples are taken at a rate (2.62 ms) that guarantees that at least 8 samples would be taken within the video field for good sampling. During SAMPLE time (FIG. 18) if a particular video format is detected, the format counter for that video format will count up. Once a particular counter reaches seven counts within the ten count sample period it would declare that video format as a winner (WINR signal 272) and stop all counters for all formats. The TAKE 10 signal (274) would then subsequently clock that winners format Enable register (F#_Enbl), enabling a particular video format to be directed to the appropriate video connector on the receiver. All other video output connectors would be disabled.

A u-Controller may also be employed in the video format identification process in accordance with the general principles of the present invention. Other appropriate implementations and/or circuit configurations may also be utilized, as needed.

Figure 6:
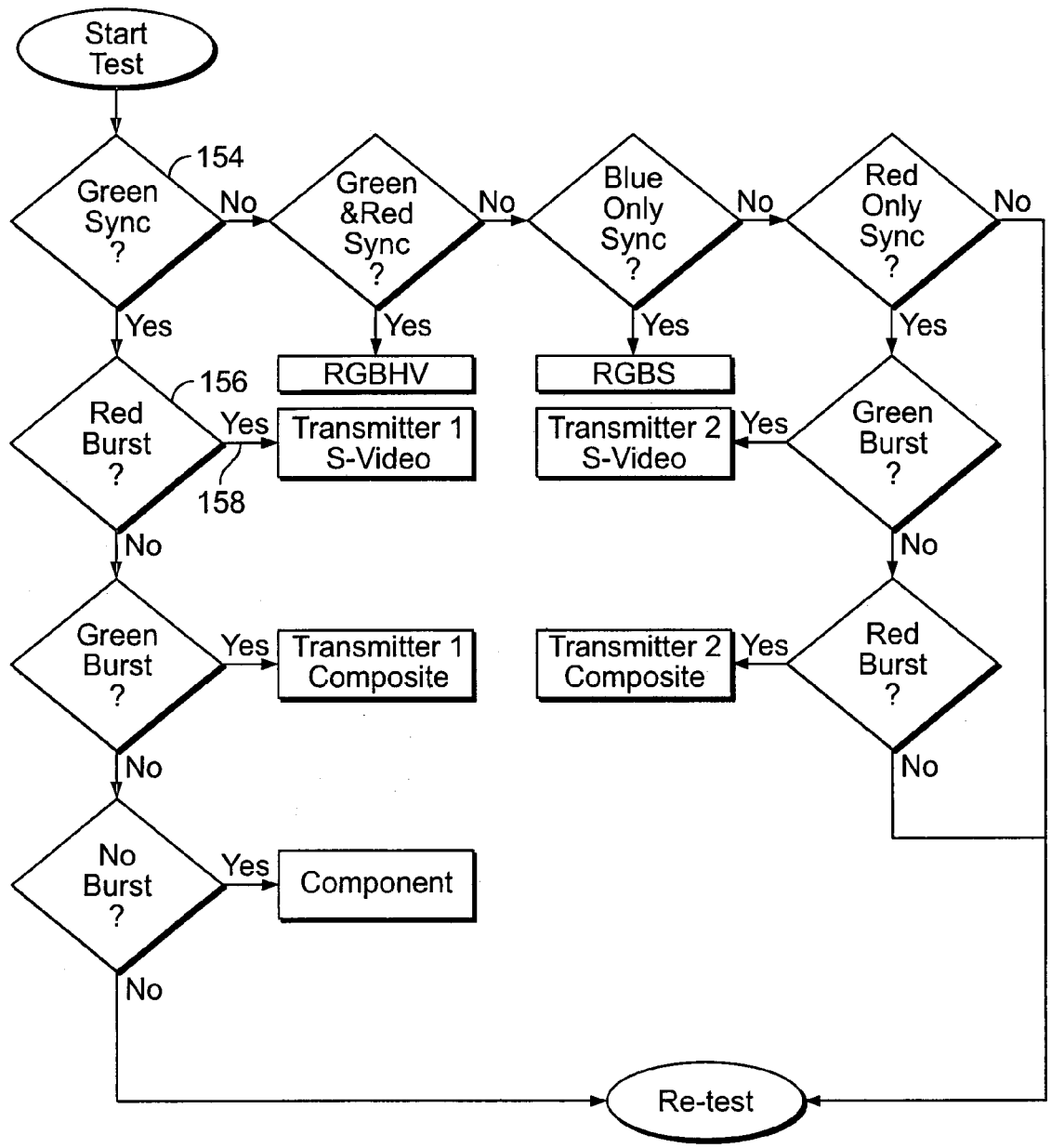
FIG. 6 is a flow chart of exemplary logic steps employed during video signal format identification in accordance with an embodiment of the present invention.

FIG. 6 shows an exemplary flow chart which represents the logic steps employed during video signal format identification in accordance with the general principles of the present invention. In one or more embodiments, the color burst occurs within a certain time period after the horizontal synchronization pulse. The detection of a color burst is accomplished by sampling only during the specified period after the horizontal sync signal has been detected. Several consecutive samples may be verified (tested) before changing video formats to prevent false detection. For example, upon starting the test, the CPLD may check for the presence of green sync signal (step 154). If such a signal is found, the CPLD may check for the presence of red burst signal (step 156). If the red burst signal is present, the detected video format is passed on to transmitter 1 (S-Video) (step 158). The remaining steps may be readily ascertained from a review of the flow chart, as shown in FIG. 6.

Figure 7:
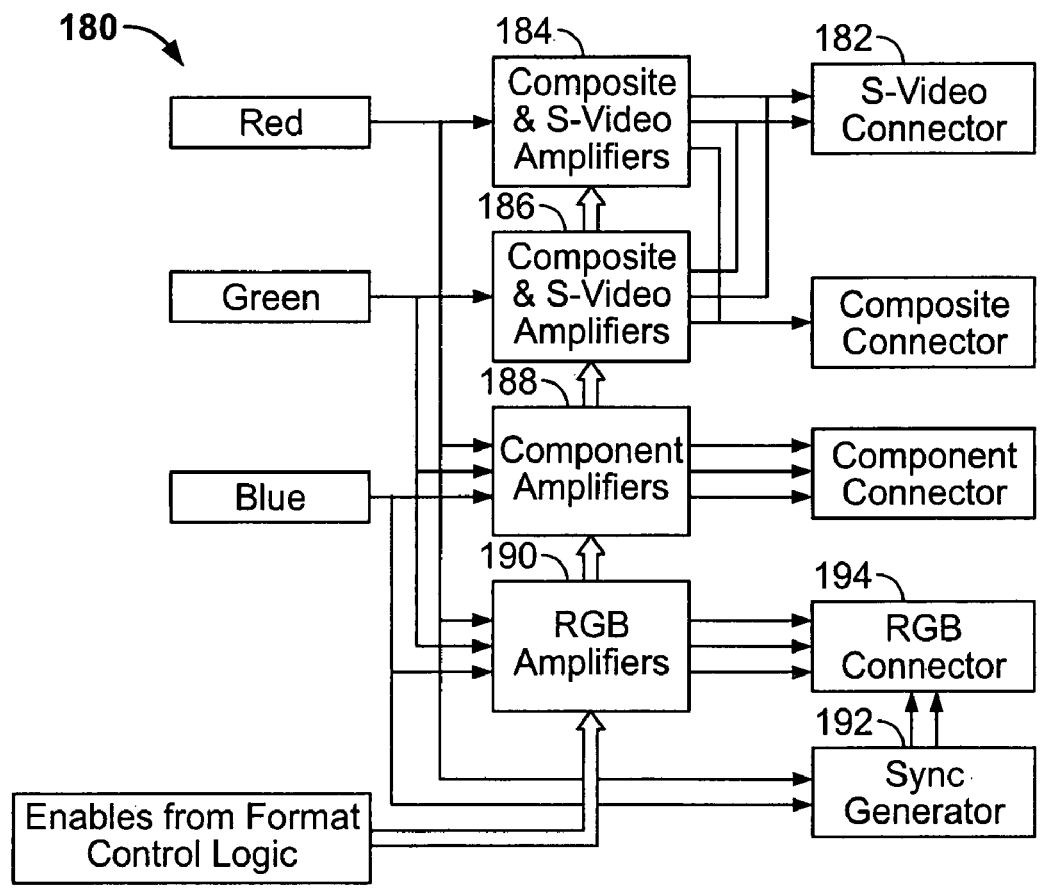
FIG. 7 is a block diagram depicting signal switching at the receiver end in accordance with an embodiment of the present invention.
Figure 8:
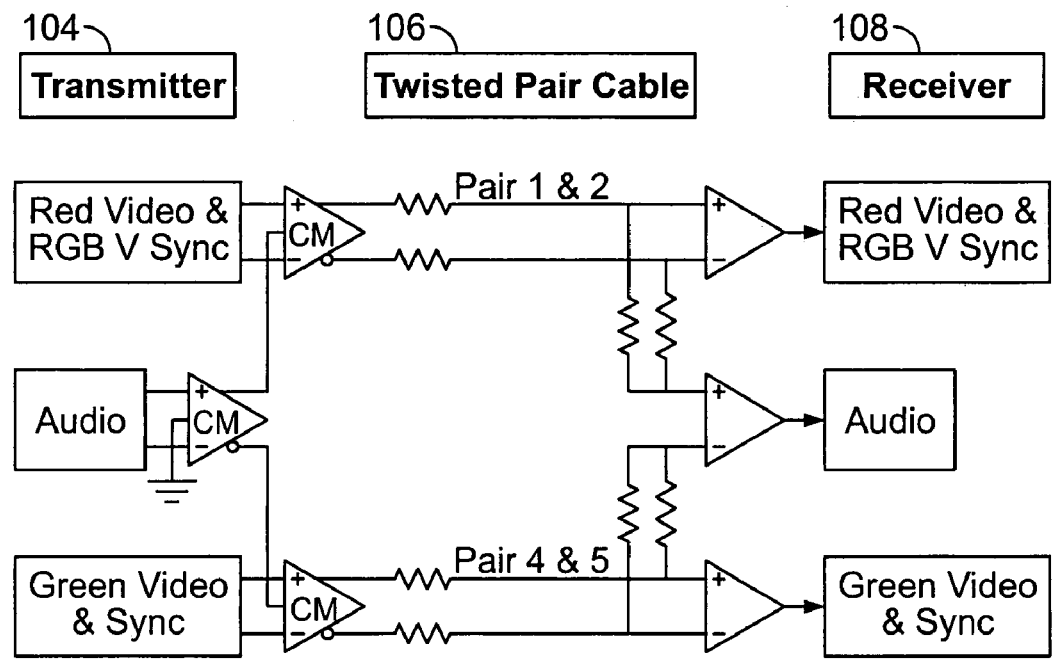
FIG. 8 is a block diagram depicting simultaneous audio, video and communication signal transmission in accordance with an embodiment of the present invention.
Figure 9:
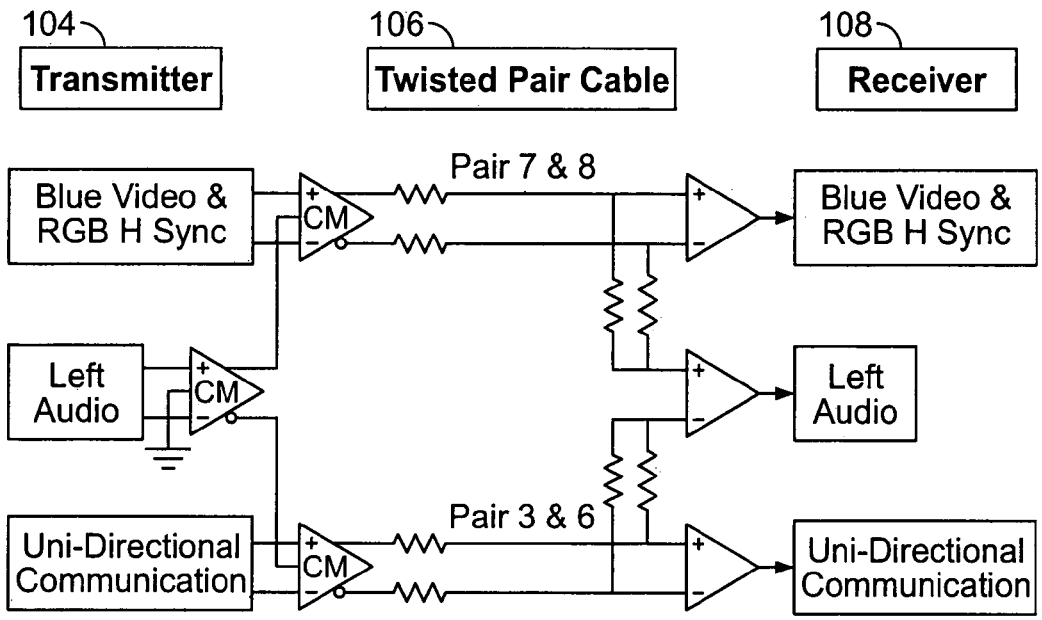
FIG. 9 is a block diagram depicting transmission of stereo audio and unidirectional communication signals in accordance with an embodiment of the present invention.

After the correct video format has been identified, red, green and blue video signals 180 (FIG. 7) are routed to the appropriate video connector, such as S-Video connector 182 (FIG. 7) with all other connectors being made inactive. This may be accomplished by disabling amplifiers that don't follow the incoming signal format. Particularly, such amplifiers are powered down and left in a high impedance state. In this regard, FIG. 7 schematically shows Composite and S-Video amplifiers 184 and 186, Component amplifiers 188 and RGB amplifiers 190 being operatively coupled to their respective connectors.

Since there are two transmitter-to-twisted pair configurations for S-Video and Composite video, there are two sets of amplifiers to enable the correct routing of signals. For the RGBHV or RGBS video formats, the synchronization signals are stripped from the video by disabling the RGB amplifiers during sync time. Also, separate sync signals are generated for the RGB video format from those embedded with the Red & Blue video signals. In this regard, FIG. 7 shows a sync generator 192 operatively coupled to RGB connector 194.

In one or more embodiments of the present invention, video and synchronization signals are sent on twisted pair cable 106 (FIG. 1) differentially. For example, the red signal may be sent on pairs 1 and 2, the green signal may be sent on pairs 4 and 5, and the blue signal may be sent on pairs 7 and 8. The fourth wire pair 3 and 6 may be used for transmission of differential audio, communication and/or DC power signals.

Known audio/video transmission systems limit the use of sending audio and communication signals at the same time. The following setup generally describes a method for transferring audio & communications along with video signals without significant modification to one or more known audio/video transmission systems.

Adding a common mode signal on top of the existing differential video signal to transfer additional information is useful. One limitation, however, is that the signal is susceptible to noise induced in the cable from external sources. Another limitation has to do with ground loops which degrade the common mode signal. To address these limitations and in accordance with the general principles of the present invention, two twisted pairs may be employed to send a differential signal in which each one of the twisted pairs operates in a common mode configuration (i.e. Common Mode/Differential or CMD), as generally shown in reference to FIG. 8.

For example, if twisted pair 1 and 2 sends the Audio+signal (FIG. 8) in a common mode configuration, while twisted pair 4 and 5 sends the Audio−signal (FIG. 8) in a common mode configuration, a differential signal is achieved between the pairs. A person skilled in the art would readily appreciate that the use of two twisted pairs in a CMD configuration has advantages over the use of a single common mode signal. Specifically, it reduces noise induced in the signal being transmitted, which would be generated by an external source. A second advantage would be enhanced noise immunity due to ground loops. Moreover, video, audio, and communication signals may be sent simultaneously using only one twisted pair cable (e.g., CAT 5). Particularly, video and sync signals may be sent differentially on twisted pairs 1 and 2, 4 and 5, and 7 and 8. Mono-Audio may be sent (in a CMD configuration) over twisted pairs 1 and 2 and 4 and 5. Bi-directional communication signals may be sent on the remaining fourth wire pair.

In one or more embodiments of the present invention, communication signals are transferred on the fourth wire pair using a Master/Slave configuration. The Master (Transmitter) has a built in state machine which may be configured, for example, to sample the source signal (i.e., a RS232 port) every 5 μsec. and drive the fourth wire pair with an LVDS (Low Voltage Differential Signal) transceiver after which it would turn off the line driver. After the Master transmits its information it will listen for a response from the Slave (Receiver). When placed in Bi-Directional mode the Slave (Receiver) also has a state machine that waits for the pulse from the Master, after which it turns the line around and enables its LVDS line driver and sends the state of its source signal. If the Slave (Receiver) is placed in unidirectional mode it will only receive data from the Master and not respond (i.e., not drive the fourth wire pair back from its end). When the Slave does not respond the Master's RS232 output is left in the idle (Mark) state.

If the source (RS232 port) is in the Mark (1) state, the unit may be configured to send a 400 ns wide pulse. If the source is in the Space (0) state, the unit would send a 100 ns wide pulse. In Bi-directional mode the Transmitter & Receiver are continuously sending back and fourth these pulses every 5 μsec. If the Receiver is placed in unidirectional mode, the Transmitter would send pulses every 5 μsec. Thus in this example, the frequency content of the pulses would be >1 MHz, i.e. a relatively high frequency compared to audio which is transmitted in the 20-20 KHz range.

In accordance with an alternative embodiment of the present invention, in cases when only unidirectional communication is required, the addition of differential amplifiers to the fourth wire pair would allow a second CMD channel to be implemented on twisted wire pairs 7 and 8 and 3 and 6. The first CMD channel would send the Right Audio source while the second CMD channel would send the Left Audio source. The second CMD channel configuration is schematically shown in reference to FIG. 9.

In accordance with another alternative embodiment of the present invention, in cases when bidirectional communication is required, the addition of high pass and low pass filters to the fourth wire pair would allow the second CMD channel to be implemented. The first CMD channel would send the Right Audio source while the second CMD channel would send the Left Audio source. The second CMD channel configuration is schematically shown in reference to FIG. 10.

Figure 10:
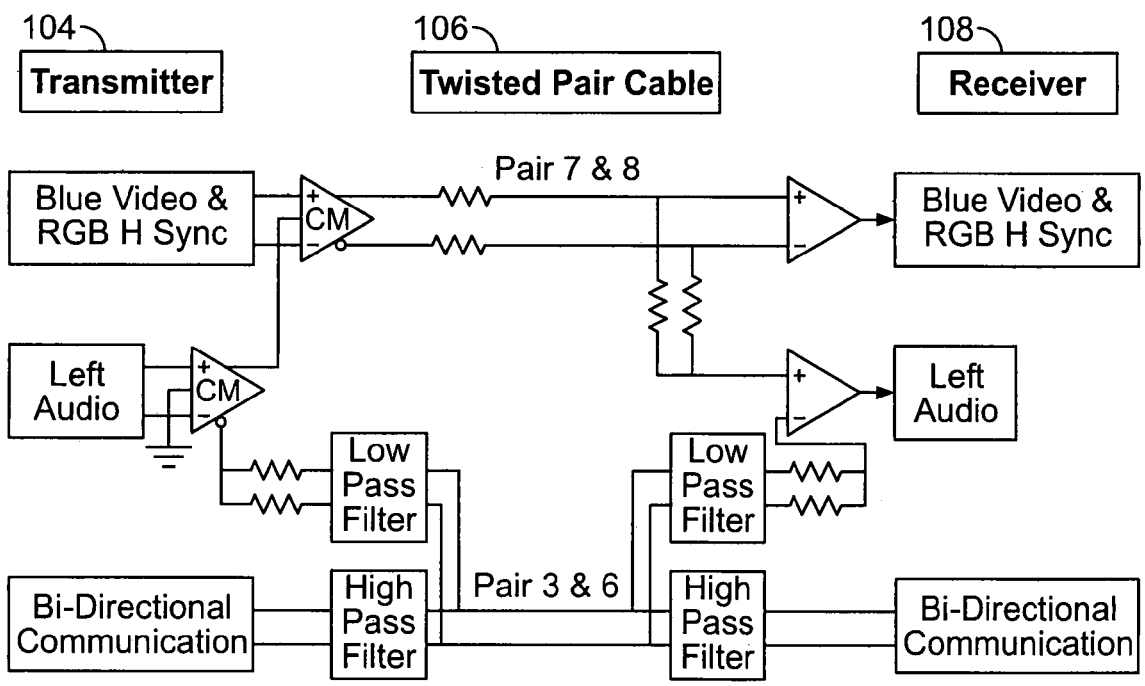
FIG. 10 is a block diagram depicting transmission of stereo audio and directional communication signals in accordance with an embodiment of the present invention.

If only Mono-Audio is required for twisted pairs 1 and 2 and 4 and 5, power signals may be sent on the fourth twisted wire pair along the low pass filter route (FIG. 10). Thus, video, audio, bidirectional communications and power could be efficiently sent on a single CAT 5 cable.

One or more embodiments of the invention are also concerned with automatically stripping synchronization signals for RGB video formats from the Red (Vertical) and Blue (Horizontal) twisted pair signals as designed within the CPLD of the present invention. Other embodiments deal with generating separate synchronization signals when detecting RGB video format.

With the RGB video format, transmitter 104 (FIG. 1) takes the separate synchronization signals and passes the same through a unipolar converter, which converts these signals to a positive polarity. The uni-polar sync signals are then subtracted from the video signals, with the red pair having the vertical sync signal and the blue pair having the horizontal sync signal for the RGBHV video format. If the video format is RGBS then the synchronization signal would be on the blue pair only, as shown in tabular form hereinabove.

In one embodiment, the input signals to the CPLD are R_Sync (Sync. on Red Detection), B_Sync (Sync. on Blue Detection), M50_Osc (50 MHz Oscillator), the FMT4 (RGBS detect), FMT7 (RGBHV detect), HPOL (Horizontal sync Polarity) and VPOL (Vertical sync Polarity). All the detection signals, R_Sync and B_Sync, come from comparators which are referenced with the appropriate voltage levels for the video signal.

Figure 21:
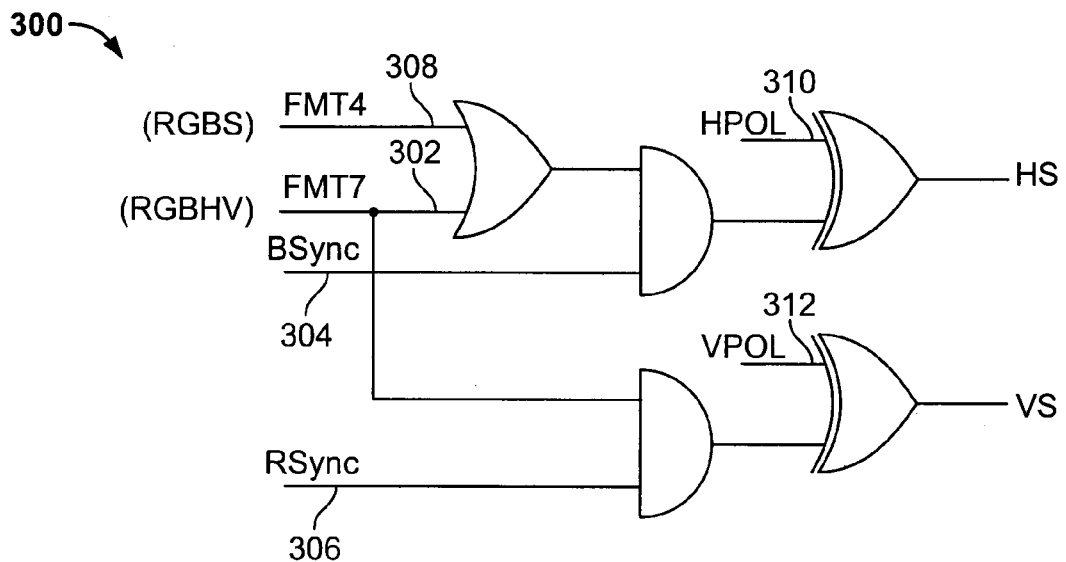
FIG. 21 is a block diagram of a synchronization generator circuit in accordance with an embodiment of the present invention.

FIG. 21 schematically depicts a synchronization generator circuit 300. If an RGBHV video format (FMT7 signal 302) is detected, both the Horizontal sync (BSYNC signal 304) and the Vertical sync (RSYNC signal 306) are enabled to go through the polarity converter to be delivered to the Horizontal and Vertical synchronization pins of the VGA connector. If RGBS video format (FMT4 signal 308) is detected, only the combined sync (BSYNC) is enabled to go through the polarity converter and to be delivered to the Horizontal synchronization pin of the VGA connector. The polarity converter is an exclusive-OR gate in which if the HPOL (310) or VPOL (312) is at high level, the corresponding synchronization signal will be inverted. Otherwise if HPOL (310) or VPOL (312) is low, the synchronization signal is not inverted. Some video formats require one or both synchronization signals to be inverted.

Figure 22:
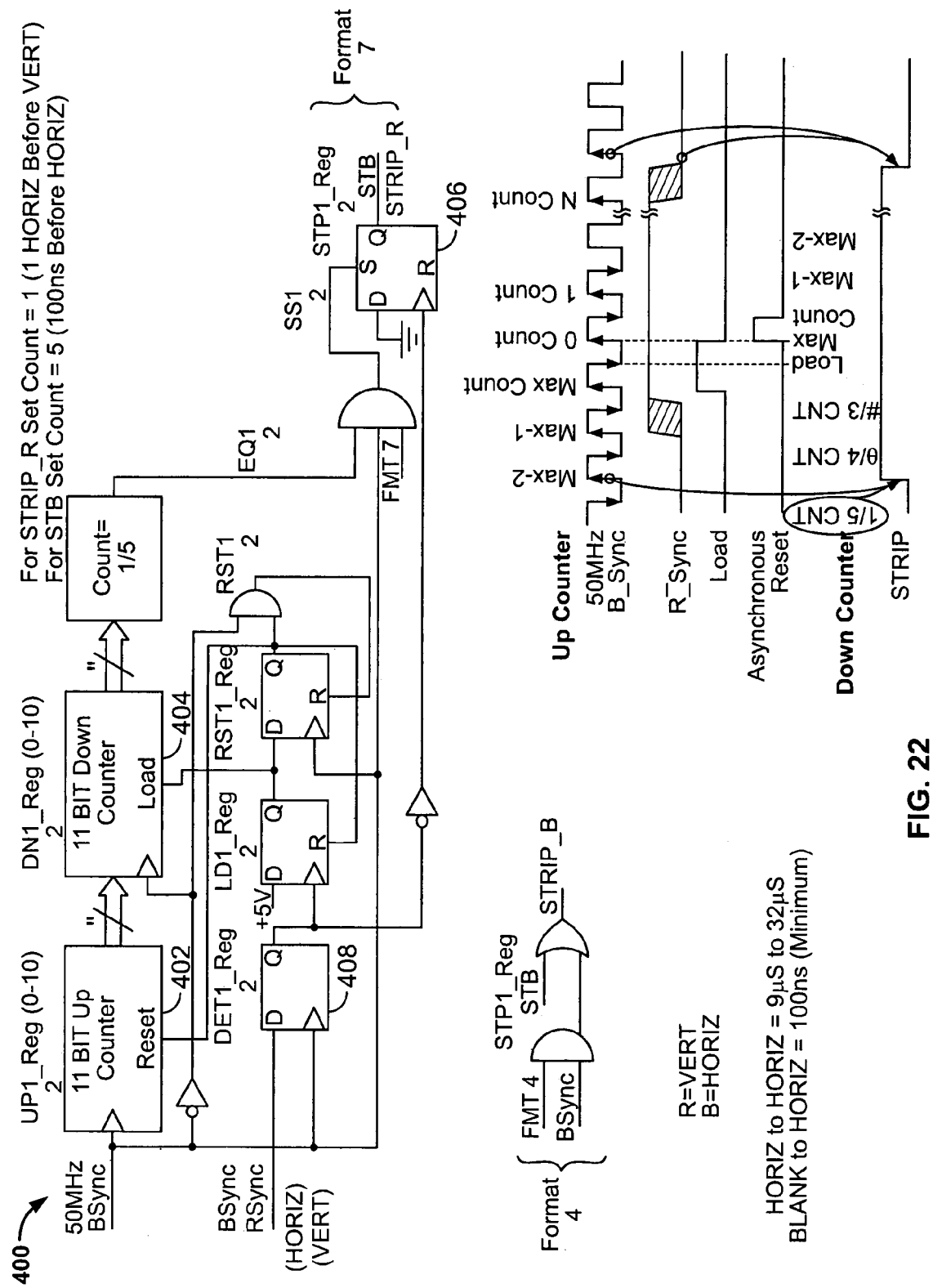
FIG. 22 is a block diagram of a synchronization signal stripper circuit in accordance with an embodiment of the present invention.

FIG. 22 schematically depicts a synchronization signal stripper circuit 400. Since synchronization signals are added to the Red and Blue video on twisted pair cable 106 (FIG. 1) for RGBHV video format, it is necessary to remove these signals from the video before delivery to the VGA video connector. The generation of separate synchronization signals takes place before the stripping of synchronization signals. Conventional setups use the synchronization signals themselves to strip the sync signals from the video. This practice leaves a remnant of the sync signal on the video because there is a slight delay between detecting a sync signal and subsequently removing the sync from the video.

For RGBHV signal format and in accordance with the general principles of the present invention, it may be desirable to measure the distance between and location of prior synchronization signals in order to remove current synchronization signals ahead of their occurrence, thus eliminating the remnant of sync in the video signal. In one exemplary embodiment, an 11-bit binary up-counter 402 and an 11-bit binary down counter 404 are utilized. There are two identical circuits in the present configuration. For simplicity, a description of horizontal sync stripping from the blue video signal follows.

When the leading edge of a sync signal (BSYNC) is detected the DET1 register will be clocked high with a clock (50 MHz). This would clock a second register (LD1) which loads the down-counter with the value in the up-counter, which has counted the time interval between synchronization signals. On the next 50 MHz clock, the reset register (RST1) will reset the up-counter and turn off the load signal to the down-counter. On the next negative transition of the 50 MHz clock, the reset register will become inactive. At that point, the up-counter begins to count the interval taken between the current and the next sync signal. The down-counter is counting down the time taken by the previous interval between the sync signals.

When the down counter reaches a count of five (5), strip register 406 (STP1) would be set active (STB), causing the video to be turned off or grounded ahead to the current synchronization signal, thus stripping the sync from the video. The video signal is turned back on after the sync signal has passed via DET1 register 408 (FIG. 22) going low and the STP1 register 406 being clocked low. An exemplary timing diagram is provided in reference to FIG. 22 to show the signal sequence.

As mentioned hereinabove, a duplicate circuit is used to remove the vertical sync (STRIP_R) from the red video signal. The difference being, that instead of counting with a 50 MHz clock, the timing interval is counted with the number of horizontal sync signals (BSYNC) between vertical sync signals (RSYNC). Also, instead of starting the strip on a count of five (5), the strip is started at a count of one (1) before the vertical sync occurs.

The exemplary embodiments described hereinabove are merely illustrative of the general principles of the present invention. Various design modifications may be employed that would reside within the scope of the invention. Thus, by way of example, but not of limitation, various alternative configurations may be utilized in accordance with the teachings herein. Accordingly, the drawings and description are illustrative and not meant to be a limitation thereof.

Moreover, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Thus, it is intended that the invention cover all embodiments and variations thereof as long as such embodiments and variations come within the scope of the appended claims and their equivalents.

What is claimed is:

1. A video format identification system for identifying a video format of a received video signal from a plurality of possible video formats comprising a plurality of component video signals, comprising:

synchronization and reference burst signal detection circuitry configured to detect synchronization and reference burst signals in said plurality of component video signals;

video format identification circuitry operatively coupled to said synchronization and reference burst signal detection circuitry configured to identify a format of said video signal dependent on a detected presence of said synchronization and reference burst signals in one or more of said component video signals;

video signal routing circuitry coupled to respective output connectors and configured to receive said component video signals and automatically route said component video signals to an appropriate one or more of said output connectors depending on said format of said video signal identified by said video format identification circuitry;

an input connector for connecting to a multi-pair cable, said input connector comprising pins for connecting to a plurality of cable pairs of said multi-pair cable;

wherein said video format identification circuitry is configured to identify each cable pair of said multi-pair cable that contains a synchronization signal.

2. The video format identification system of claim 1 wherein said video format identification circuitry is configured to identify each cable pair of said multi-pair cable that contains a reference burst signal.

3. The video format identification system of claim 2 wherein said video format identification circuitry is configured to identify said format of said video signal from an identity of each cable pair of said multi-pair cable that contains a synchronization signal and an identity of each cable pair of said multi-pair cable that contains a reference burst signal.

4. The video format identification system of claim 3 wherein said multi-pair cable comprises a plurality of twisted pairs.

5. The video format identification system of claim 4 wherein said multi-pair cable comprises four twisted pairs.

6. The video format identification system of claim 1, wherein said video format identification circuitry comprises logic circuitry configured to identify said format of said video signal.

7. The video format identification system of claim 6, wherein said logic circuitry comprises a Complex Programmable Logic Device (CPLD).

8. A method for identifying a format of a video signal from a plurality of possible formats comprising the steps of:
- transmitting a video signal comprising a plurality of component video signals over a multi-pair cable, at least one of said component video signals comprising a synchronization signal and at least one of said component video signals comprising a reference burst signal, each of said component video signals being transmitted over a respective pair of said multi-pair cable, said multi-pair cable comprising a plurality of twisted pairs;
- receiving said plurality of component video signals;
- identifying each of said plurality of component video signals that comprises a synchronization signal;
- identifying each of said plurality of component video signals that comprises a reference burst signal;
- identifying said format of said video signal from an identity of each of said plurality of component video signals that comprises a synchronization signal and an identity of each of said plurality of component video signals that comprises a reference burst signal;
- routing said video signal to one or more output connectors depending on said identified format of said video signal.

9. The method of claim 8 further comprising the step of adding a reference burst signal to at least one of said video component signals prior to transmitting said video signal.

10. The method of claim 8 further comprising the step of adding a synchronization signal to at least one of said video component signals prior to transmitting said video signal.

11. The method of claim 8 further comprising the step of removing a synchronization signal from at least one of said video component signals prior to routing said video signal to said one or more output connectors.

12. The method of claim 8 further comprising the step of removing a reference burst signal from at least one of said video component signals prior to routing said video signal to said one or more output connectors.

13. The method of claim 8 wherein said video component signals comprise a red component signal, a green component signal, and a blue component signal.

14. The method of claim 8 wherein said video component signals comprise a chrominance component signal and a luminance component signal.

* * * * *